UNITED STATES PATENT OFFICE.

BERNARD J. DEVER AND BERTRAM J. DELZEIT, OF PHILADELPHIA, PENNSYLVANIA.

PYROTECHNIC COMPOUND.

969,252.  Specification of Letters Patent.  Patented Sept. 6, 1910.

No Drawing.  Application filed October 25, 1909. Serial No. 524,513.

*To all whom it may concern:*

Be it known that we, BERNARD J. DEVER and BERTRAM J. DELZEIT, citizens of the United States, residing in Philadelphia, in the State of Pennsylvania, have invented a new and useful Improvement in Pyrotechnic Compounds, of which the following is a specification.

This invention relates generally to pyrotechnical compounds and more particularly to a harmless detonating compound which can be exploded either by friction or concussion, and when so exploded will produce a rapid succession of explosions simulating the reports of a pack of fire crackers.

The object of our invention is to provide a compound embodying these characteristics which will be inexpensive to manufacture, and safe and easy to handle, and a still further object is to provide a compound which can be used either upon a stick, or in the form of a capsule.

With these objects in view our invention consists in combining white phosphorus, chlorate of potash, clay, sulfid of antimony, gum arabic, bichromate of potash in the manner hereinafter set forth and claimed.

In carrying out our invention we dissolve the gum arabic and phosphorus together, using a requisite amount of water as a solvent according to the consistency required. We then put in the clay and after that introduce the other ingredients and thoroughly commingle the same, and after the mixture has been thoroughly mixed, it is placed in paper capsules, and the papers folded over the same providing a suitable form of torpedo, or the mixture can be spread upon a flat or round stick as desired.

The ingredients of our compound are preferably employed in the following proportions: namely, one part of white phosphorus, two and one-half parts of chlorate of potash, three parts of clay, one and one-half parts of black sulfid of antimony, six parts of gum arabic, and one-fourth part bichromate of potash, 8¾ parts of water and the temperature to which the mixture is heated during the process of manufacture varies from 112 degrees to 120 degrees Fahrenheit.

By use of sulfid of antimony and bichromate of potash we produce a compound in which the explosions are much louder than the explosions of compounds heretofore made and the ingredients are more nearly consumed during the burning and explosive actions.

When the compound is used in the form of a torpedo, it is exploded by placing it upon the ground, and pressing or striking it with either the heel or toe of the shoe, and the result is that the compound is exploded, producing a series of loud reports in quick succession, and simultaneously a series of bright scintillations.

When the compound is placed upon a stick it is exploded by means of friction, but the results are exactly the same. Our compound we have found not only produces the series of loud reports, but is nearly consumed whereas the compounds of this character heretofore employed have always left disagreeable deposits after the explosion.

Having thus fully described our invention, what we claim as new and useful is:

1. A pyrotechnical compound consisting of white phosphorus, chlorate of potash, clay, sulfid of antimony, gum arabic, bichromate of potash.

2. A pyrotechnical compound consisting of one part white phosphorus, two and one-half parts chlorate of potash, three parts clay, one and one-half parts black sulfid of antimony, six parts gum arabic, and one-quarter part bichromate of potash, all of said parts being mixed and applied as set forth.

BERNARD J. DEVER.
BERTRAM J. DELZEIT.

Witnesses:
JOHN J. CARR,
A. J. TOWN.